United States Patent
Chang et al.

(10) Patent No.: US 9,170,698 B2
(45) Date of Patent: *Oct. 27, 2015

(54) APPARATUS AND METHOD FOR CONTROLLING OPERATION OF MOBILE TERMINAL

(71) Applicant: Samsung Electronics Co., Ltd., Suwon-Si, Gyeonggi-Do (KR)

(72) Inventors: Wook Chang, Seoul (KR); Joon-Ah Park, Suwon-si (KR); Hyun-Jeong Lee, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,895

(22) Filed: Nov. 28, 2014

(65) Prior Publication Data

US 2015/0084925 A1  Mar. 26, 2015

Related U.S. Application Data

(63) Continuation of application No. 12/076,945, filed on Mar. 25, 2008, now Pat. No. 8,928,594.

(30) Foreign Application Priority Data

Sep. 11, 2007  (KR) .................. 10-2007-0092097

(51) Int. Cl.
  *G09G 5/00*  (2006.01)
  *G06F 3/044*  (2006.01)
  *G06F 1/16*  (2006.01)
  *G06F 3/041*  (2006.01)
  *G06F 3/01*  (2006.01)

(52) U.S. Cl.
  CPC ................. *G06F 3/044* (2013.01); *G06F 1/169* (2013.01); *G06F 1/1615* (2013.01); *G06F 1/1652* (2013.01); *G06F 3/017* (2013.01); *G06F 3/0412* (2013.01); *G06F 3/0414* (2013.01); *G06F 3/0416* (2013.01)

(58) Field of Classification Search
  CPC ..... G06F 3/041; G06F 3/0416; G06F 3/0412; G06F 3/04883; G06F 3/0488; G06F 3/03545; G06F 3/044
  See application file for complete search history.

(56) References Cited

U.S. PATENT DOCUMENTS

| | | | |
|---|---|---|---|
| 7,089,388 | B1 | 8/2006 | Takaragi et al. |
| 7,212,835 | B2 | 5/2007 | Mantyjarvi et al. |
| 7,825,910 | B2 | 11/2010 | Won |
| 2001/0044318 | A1 | 11/2001 | Mantyjarvi et al. |

(Continued)

FOREIGN PATENT DOCUMENTS

| | | |
|---|---|---|
| JP | 2003186597 A | 7/2003 |
| JP | 2004177994 A | 6/2004 |

(Continued)

*Primary Examiner* — Olga Merkoulova
(74) *Attorney, Agent, or Firm* — Harness, Dickey & Pierce, P.L.C.

(57) ABSTRACT

A method of controlling the operation of a mobile terminal is provided. By dynamically selecting or setting a specific function of a mobile terminal according to a change in pressure or contact areas sensed by a plurality of touch sensors which cover the mobile terminal, a user can easily select or set a specific function of the mobile terminal according to his or her intention, and easily recognize information displayed on a screen of the mobile terminal.

26 Claims, 12 Drawing Sheets

(56) References Cited

U.S. PATENT DOCUMENTS

| | | |
|---|---|---|
| 2003/0080947 A1* | 5/2003 | Genest et al. ............... 345/173 |
| 2003/0123328 A1 | 7/2003 | Guanter |
| 2006/0244727 A1 | 11/2006 | Salman et al. |
| 2006/0244732 A1* | 11/2006 | Geaghan .................. 345/173 |
| 2007/0002016 A1* | 1/2007 | Cho et al. .................. 345/157 |
| 2007/0291013 A1 | 12/2007 | Won |
| 2008/0297475 A1 | 12/2008 | Woolf et al. |

FOREIGN PATENT DOCUMENTS

| | | |
|---|---|---|
| KR | 20010050145 A | 6/2001 |
| KR | 20060028295 A | 3/2006 |
| KR | 20070001440 A | 1/2007 |
| KR | 20070070897 A | 7/2007 |

* cited by examiner

FRONT SURFACE

REAR SURFACE

REAR SURFACE

FRONT SURFACE

REAR SURFACE

APPARATUS AND METHOD FOR CONTROLLING OPERATION OF MOBILE TERMINAL

CROSS REFERENCE TO RELATED APPLICATIONS

This application is a continuation of U.S. application Ser. No. 12/076,945, filed on Mar. 25, 2008, which claims priority to Korean Application No. 10-2007-0092097 filed on Sep. 11, 2007, the entire contents of each of which are hereby incorporated by reference.

BACKGROUND OF THE INVENTION

1. Field of the Invention

The present invention relates to a method for controlling the operation of a mobile terminal, and more particularly, to an apparatus and method for controlling the operation of a mobile terminal using a sensor which is disposed on the mobile terminal.

2. Description of the Related Art

Mobile terminals such as cellular phones have recently been developed to integrate and merge the functions of various electronic products, in addition to providing the functions of voice calls, and transmission and reception of text messages. For example, mobile phones which function as an MP3 player, a digital camera, an electronic dictionary, a digital TV, etc. are being developed.

Along with an increase in functions of a mobile terminal, extra components (for example, buttons) for executing the functions are added. However, when the number of buttons of a mobile terminal increases, users find it more difficult to rapidly select a button to execute a desired function or to rapidly set a desired function.

Meanwhile, instead of selecting a specific function by pressing a button of a mobile terminal, a method of displaying a Graphic User Interface (GUI) on a screen of the mobile terminal and allowing a user to select a specific function through the GUI has been proposed. However, in the method, since part of the screen of the mobile terminal should be used to display the GUI, users may have difficulties in recognizing all information displayed on the screen of the mobile terminal. For example, if a GUI for zooming in or out on a map overlaps part of a screen on which the map is displayed, there may be difficulty in viewing the part of the screen that the GUI overlaps.

Therefore, instead of allowing a user to select or set a specific function of a mobile terminal using a physical button or through a GUI, a new user interface that selects or sets a specific function by sensing a user's motion is required.

SUMMARY OF THE INVENTION

The present invention provides an apparatus and method for selecting or setting a specific function of a mobile terminal by sensing a user's motion, instead of allowing the user to select or set the specific function by using a physical button or through a Graphic User Interface (GUI).

In order to achieve the object, the present invention discloses an apparatus and method for controlling the operation of a mobile terminal, by executing functions or applications of the mobile terminal, dynamically, according to information about pressure applied by a user to a touch sensor which is disposed on the mobile terminal.

According to an aspect of the present invention, there is provided an apparatus for controlling an operation of a mobile terminal, including: a plurality of touch sensors disposed on the mobile terminal; a recognition unit recognizing a function corresponding to pressure applied to the mobile terminal and/or to contact areas of the mobile terminal which a user contacts, wherein the pressure and the contact areas are sensed by the plurality of touch sensors; and a control unit controlling an operation corresponding to the function.

The plurality of touch sensors are a plurality of pressure touch sensors which sense pressure applied to the outer surface of the mobile terminal, or a plurality of capacitive touch sensors whose capacitances change according to pressure applied to the outer surface of the mobile terminal. The plurality of touch sensors are disposed on at least one of front and rear surfaces of the mobile terminal.

The recognition unit includes: a storage unit storing information about functions corresponding to pressure applied to the mobile terminal or contact areas of the mobile terminal which a user contacts; and a function recognition unit searching for the function corresponding to the pressure and/or the contact areas of the mobile terminal, sensed by the plurality of touch sensors, from the storage unit, and providing information about the function to the control unit.

The function recognition unit recognizes the function corresponding to the pressure and/or the contact areas of the mobile terminal, sensed by the plurality of touch sensors, through any one of a neural network, template matching, a hidden Markov model, and a support vector machine (SVM).

According to another aspect of the present invention, there is provided a method for controlling an operation of a mobile terminal, including: sensing pressure applied by a user to the mobile terminal, and/or contact areas of the mobile terminal which the user contacts; recognizing a function corresponding to the sensed pressure and/or the sensed contact areas of the mobile terminal; and controlling an operation of the mobile terminal according to the function.

The sensing of the pressure and/or the contact areas of the mobile terminal includes: receiving a signal from a plurality of touch sensors arranged on an outer surface of the mobile terminal; and sensing the pressure and/or the contact areas of the mobile terminal using the signal received from the plurality of touch sensors.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
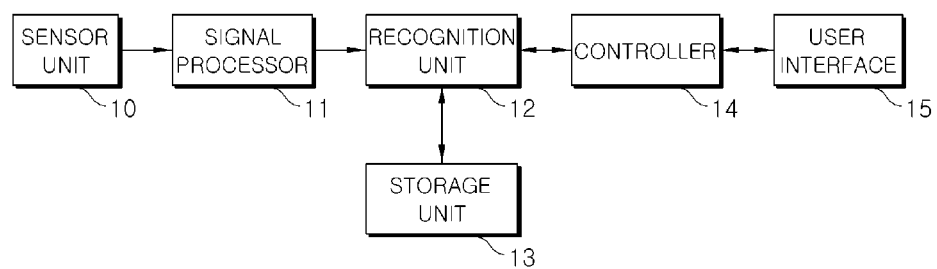
FIG. 1 is a block diagram of an apparatus for controlling the operation of a mobile terminal, according to an embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram of an apparatus for controlling the operation of a mobile terminal, according to an embodiment of the present invention.

Referring to FIG. 1, the mobile terminal operation control apparatus includes a sensor unit 10, a signal processor 11, a recognition unit 12, a storage unit 13, a controller 14, and a user interface 15.

The sensor unit 10 is disposed on the outer surface of the mobile terminal, and includes a plurality of touch sensors. The touch sensors may be pressure touch sensors which sense pressure applied to the outer surface of the mobile terminal, or capacitive touch sensors whose capacitances change according to pressure applied to the outer surface of the mobile terminal.

Figure 2:
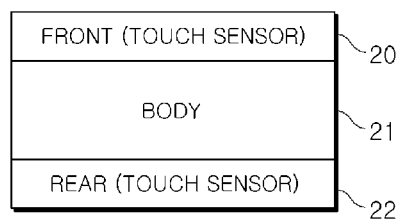
FIG. 2 is a cross-sectional view of a mobile terminal according to an embodiment of the present invention.

FIG. 2 is a cross-sectional view of a mobile terminal according to an embodiment of the present invention.

As illustrated in FIG. 2, it is preferable that touch sensors 20 and 22 are respectively arranged on the front and rear surfaces of a mobile terminal body 21. Also, a plurality of touch sensors can be disposed on at least one lateral surface of the mobile terminal body 21.

Figure 3A:
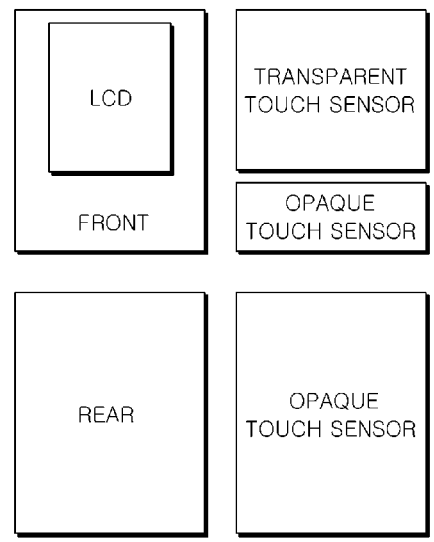
FIGS. 3A and 3B illustrate arrangements of touch sensors which cover the mobile terminal illustrated in FIG. 2, according to an embodiment of the present invention.
Figure 3B:
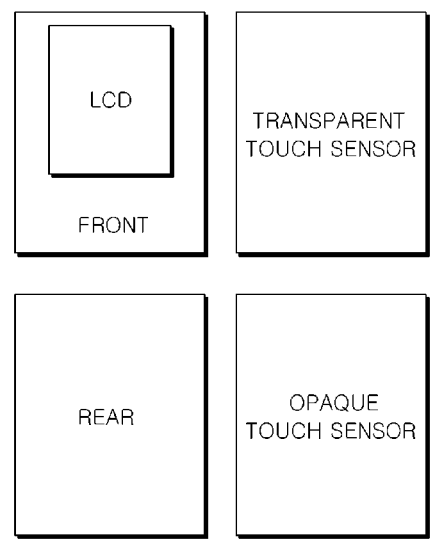

Exemplary arrangements of the touch sensors that cover the front and rear surfaces of the mobile terminal are shown in FIGS. 3A and 3B.

As illustrated in FIG. 3A, a transparent touch sensor is disposed on an area corresponding to a display screen such as a Liquid Crystal Display (LCD), and an opaque touch sensor is disposed on the remaining area, in the front surface of the mobile terminal.

Also, an opaque touch sensor is disposed on the rear surface of the mobile terminal. The opaque touch sensor disposed on the rear surface of the mobile terminal may be a flexible opaque touch sensor.

Meanwhile, in an arrangement of touch sensors illustrated in FIG. 3B, a transparent touch sensor is disposed on the entire front surface of a mobile terminal, and an opaque touch sensor is disposed on the entire rear surface of the mobile terminal. The opaque touch sensor disposed on the rear surface of the mobile terminal may be a flexible opaque touch sensor.

Returning to FIG. 1, the signal processor 11 recognizes whether the mobile terminal is gripped by a user through the plurality of touch sensors. If the mobile terminal is gripped by the user the signal processor 11 receives information about contact areas of the mobile terminal that the user's fingers contact and about pressure applied to the contact areas, which are sensed by the plurality of touch sensors, and transmits the information about the contact areas or pressure to the recognition unit 12.

The recognition unit 12 recognizes a function corresponding to the information about the contact areas or pressure, on the basis of data stored in the storage unit 15, thereby recognizing the user's intention. That is, the storage unit 15 stores functions corresponding to information about contact areas or pressure.

Figure 4A:
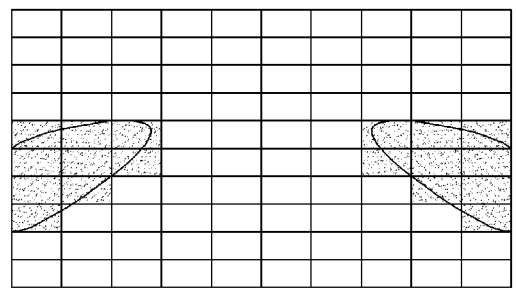
FIGS. 4A, 4B, and 4C are views showing contact areas that a user's fingers contact at the front and rear surfaces of a mobile terminal, and a picture in which the user grips the mobile terminal, according to an embodiment of the present invention.
Figure 4B:
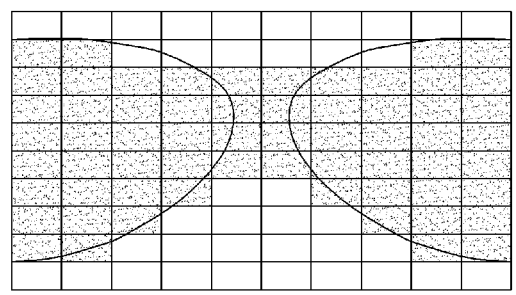
Figure 5A:
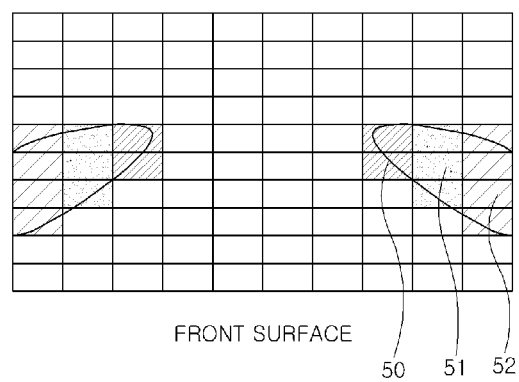
FIGS. 5A through 5F are views showing contact areas that a user's fingers contact at the front and rear surfaces of a mobile terminal, and pressure applied to the contact areas of the front and rear surfaces of the mobile terminal, and pictures in which the user grips the mobile terminal, according to an embodiment of the present invention.
Figure 5B:
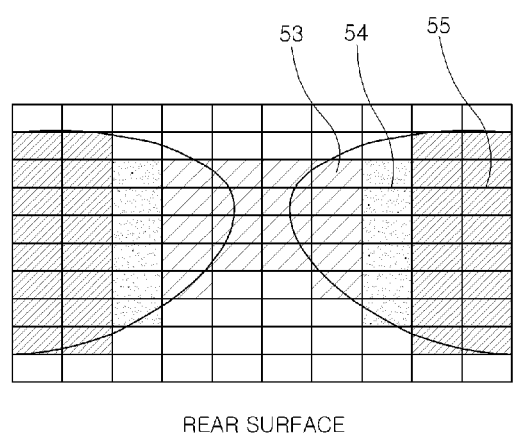

For example, the signal processor 11 determines whether the mobile terminal is grasped by a user, through the sensor unit 10, as illustrated in FIGS. 4A and 4B. If it is determined that the mobile terminal is gripped by the user the signal processor 11 then detects contact areas of the mobile terminal which the user contacts, according to a change in pressure applied to the sensor unit 10 or in capacitance of the sensor unit 10, as illustrated in FIGS. 5A and 5B or in FIGS. 5C and 5D, and provides information about the contact areas to the recognition unit 12.

FIG. 4A is a view showing contact areas that a user's fingers contact at the front surface of a mobile terminal, wherein the contact areas are shadowed.

FIG. 4B is a view showing contact areas that the user's fingers contact at the rear surface of the mobile terminal, wherein the contact areas also are shadowed.

Figure 4C:
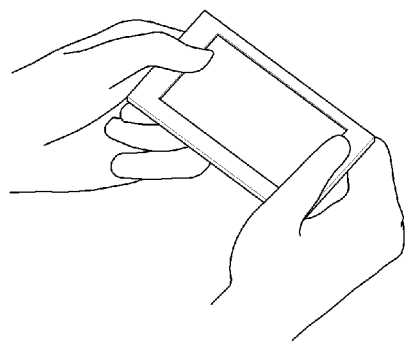

FIG. 4C illustrates a picture in which the user just grips the mobile terminal without applying any pressure to the mobile terminal.

FIG. 5A is a view showing contact areas that the user is fingers contact on the front surface of the mobile terminal, and pressure applied to the contact areas, when the user bends the mobile terminal inward, wherein the contact areas are shadowed. Comparing FIG. 5A to 4A, the contact areas having the same shadow level as illustrated in FIG. 4A are converted into first, second, and third contact areas 50, 51, and 52 having different shadow levels as illustrated in FIG. 5A. In FIG. 5A, the order of the pressure values of the first, second, and third areas 50, 51, and 52 is the first area 50>the second area 51>the third area 52.

FIG. 5B is a view showing contact areas that the user's fingers contact at the rear surface of the mobile terminal, and pressure applied to the contact areas, when the user bends the mobile terminal inward, wherein the contact areas are shadowed. Comparing FIG. 5B to 4B, the contact areas having the same shadow level as illustrated in FIG. 4B are converted into fourth, fifth, and sixth contact areas 53, 54, and 55 having different shadow levels as illustrated in FIG. 5B. In FIG. 5B, the order of the pressure values of the fourth, fifth, and sixth areas 53, 54, and 55 is the fourth area 53>the fifth area 54>the sixth area 55.

Figure 5C:
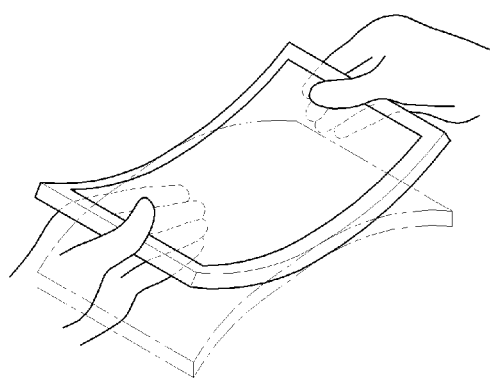

FIG. 5C illustrates a picture in which the user grips the mobile terminal while bending the mobile terminal inward.

Figure 5D:
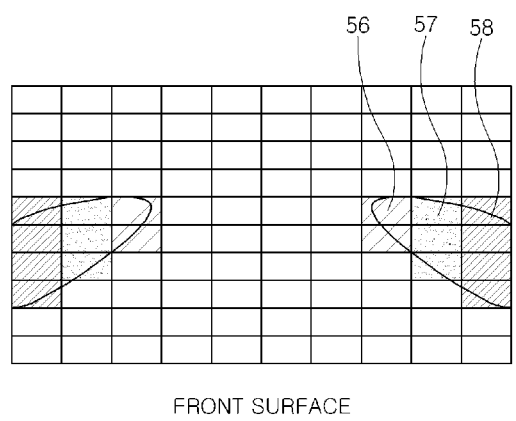

FIG. 5D is a view showing contact areas that the user's fingers contact on the front surface of the mobile terminal, and pressure applied to the contact areas, when the user bends the mobile terminal outward, wherein the contact areas are shadowed. Comparing FIG. 5D to FIG. 4A, the contact areas having the same shadow level as illustrated in FIG. 4A are converted into seventh, eighth, and ninth contact areas 56, 57, and 58 having different shadow levels as illustrated in FIG. 5D. In FIG. 5D, the order of the pressure values of the seventh, eighth, and ninth areas 56, 57, and 58 is the seventh area 56>the eighth area 57>the ninth area 58.

Figure 5E:
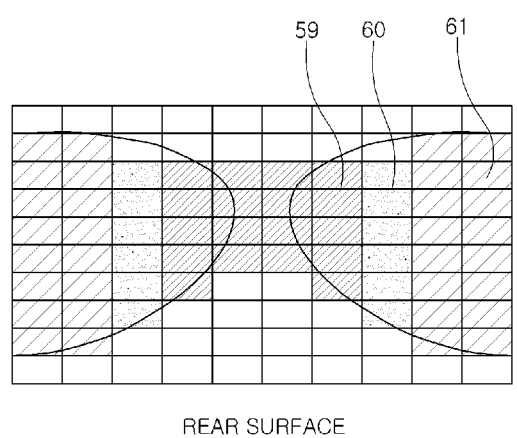

FIG. 5E is a view showing contact areas that the user's fingers contact on the rear surface of the mobile terminal, and pressure applied to the contact areas, when the user bends the mobile terminal outward, wherein the contact areas are shadowed. Comparing FIG. 5E to FIG. 4B, the contact areas having the same shadow level as illustrated in FIG. 4B are converted into tenth, eleventh, and twelfth contact areas 59, 60, and 61 having different shadow levels as illustrated in FIG. 5E. In FIG. 5E, the order of the pressure values of the tenth, eleventh, and twelfth contact areas 59, 60, and 61 is the tenth area 59>the eleventh area 60>the twelfth area 61.

Figure 5F:
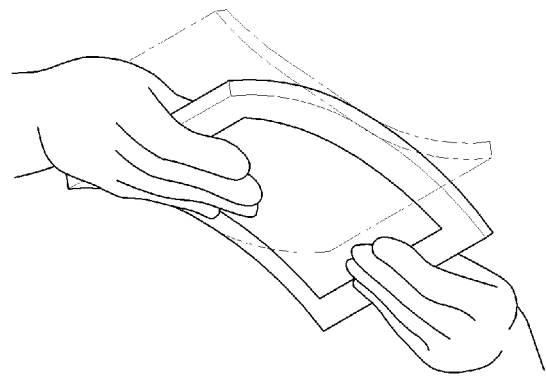

FIG. 5F illustrates a picture in which the user grips the mobile terminal while bending the mobile terminal outward.

As described above, the recognition unit 12 recognizes the user's intention on the basis of function information corresponding to information about pressure or contact areas, which is stored in the storage unit 13.

The recognition unit 12 can perform pattern recognition in order to recognize the user's intention, on the basis of the information about pressure and contact areas.

General pattern recognition methods will be described below.

First, a large amount of data about an input X and a class C is collected from a user. Second, the collected data is classified into learning data and test data. Third, the learning data is provided to a pattern recognition system to perform learning. Then, model parameters of the pattern recognition system are changed according to the learning data. Finally, only the input X is provided to the pattern recognition system, so that the pattern recognition system outputs the class C.

A pattern recognition method according to a first embodiment of the present invention uses a neural network. A neural network, which is a model for simplifying a synaptic neurotransmission process of living things and mathematically interpreting the synaptic neurotransmission process, is used to analyze problems through a kind of learning process for adjusting the connection weights of neurons which are interconnected in a complex pattern while passing data through the neurons. The pattern recognition method is similar to the learning and memorizing process of the human brain, and deduction, classification, prediction, etc. can be performed through the pattern recognition method. In the neural network, a neuron corresponds to a node, and a connection strength between neurons corresponds to a weight connected to an arc between nodes. The neural network may be a multi-layer perceptron neural network consisting of a plurality of single-layer perceptrons.

In a pattern recognition method according to a second embodiment of the present invention a user's motion pattern is recognized using a support vector machine (SVM). According to the pattern recognition method, a N-dimensional space is formed using characteristics of N motion signals, a proper hyperplane is created from the N-dimensional space using learning data, and a pattern is recognized from the hyperplane.

In a pattern recognition method according to a third embodiment of the present invention a motion pattern is recognized using template matching. According to the pattern recognition method, patterns are classified on the basis of learning data to create template data, template data which is most similar in distance to an input value is searched for from among the template data, and a pattern is recognized from the search template data.

A pattern recognition method according to a fourth embodiment of the present invention uses a hidden Markov model. The hidden Markov model is a finite state machine having transition probabilities between states, wherein each state cannot be directly observed, but can be recognized from observable states.

Returning to FIG. 1, the controller 13 generates an operation control signal regarding the function recognized by the recognition unit 12, and transfers the operation control signal to the user interface unit 14.

The user interface unit 14 performs a specific function of the mobile terminal or an application operation which is being executed, according to the operation control signal.

For example, if the user bends the mobile terminal inward, while a web page is displayed and executed on the screen of the mobile terminal, the web page can be reduced.

Figure 6:
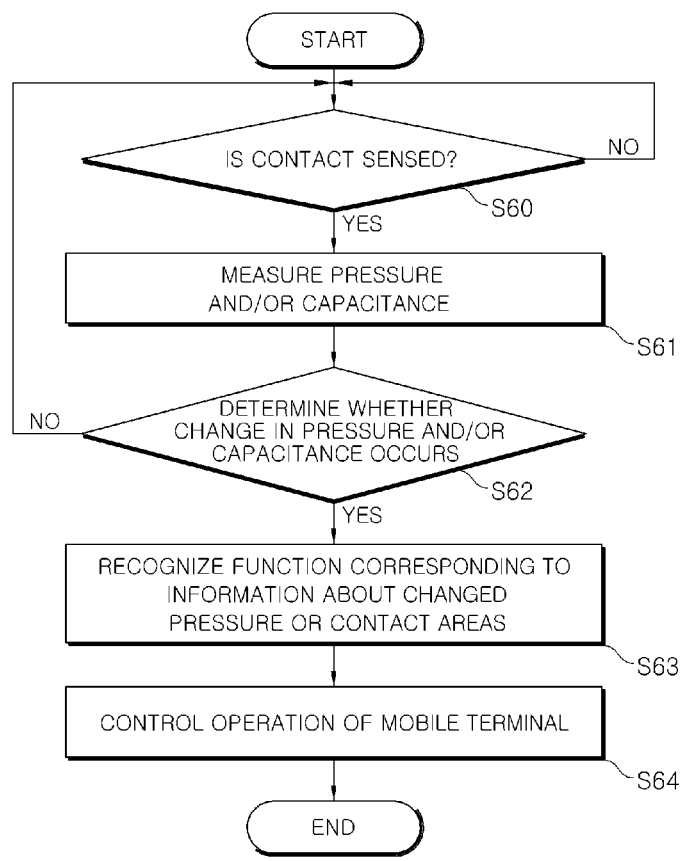
FIG. 6 is a flowchart of a method for controlling the operation of a mobile terminal, according to an embodiment of the present invention.

FIG. 6 is a flowchart of a method for controlling the operation of a mobile terminal, according to an embodiment of the present invention.

As illustrated in FIG. 6, it is determined whether the mobile terminal is contacted by a user, through a plurality of touch sensors which cover the outer surface of the mobile terminal (operation S60). That is, it is determined whether the mobile terminal is gripped by a user, through a plurality of touch sensors.

At this point, the plurality of touch sensors may be a plurality of pressure touch sensors which sense pressure applied to the outer surface of the mobile terminal, or a plurality of capacitive touch sensors whose capacitances change according to pressure applied to the outer surface of the mobile terminal.

If the plurality of touch sensors determine that the mobile terminal is gripped by the user, pressure applied to the mobile terminal or capacitance of the plurality of touch sensors is measured (operation S61). Then, it is determined whether a change in pressure or a change in contact areas due to a change in capacitance occurs according to the measurement result of the pressure or capacitance (operation S62).

When the change in pressure or the change in contact areas due to the change in capacitance is detected, a function corresponding to the changed pressure or the changed contact areas is searched for in a database, or a function corresponding to information about the changed pressure or the changed contact areas is recognized through pattern recognition (operation S63).

The pattern recognition can be performed through a neural network, template matching, a hidden Markov model, a support vector machine (SVM), etc.

Then, the mobile terminal generates an operation control signal corresponding to the function to control the function or the operation of an application which is being executed (operation S64).

Hereinafter, a method for controlling the operation of a mobile terminal, according to an embodiment of the present invention, will be described by using as an example a case where 8 touch sensors are disposed on the mobile terminal. Here, the number of touch sensors is not limited to 8.

Figure 7:
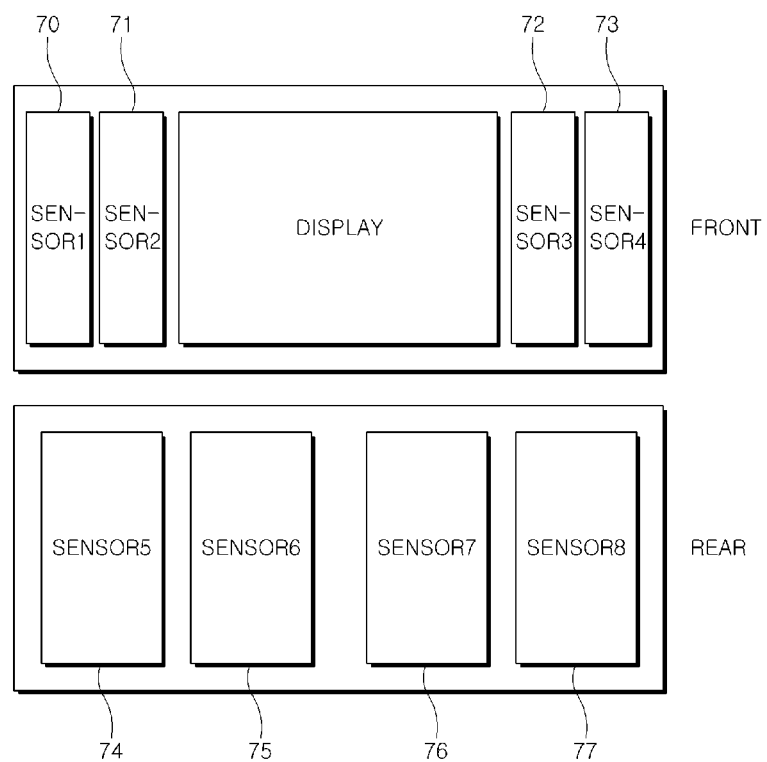
FIG. 7 illustrates an arrangement of 8 touch sensors which cover the mobile terminal.

An arrangement of the 8 touch sensors which cover the mobile terminal is illustrated in FIG. 7.

Referring to FIG. 7, touch sensors 1, 2, 3, and 4 are arranged on the front surface of the mobile terminal in such a manner that the touch sensors 1 and 2 and the touch sensors 3 and 4 are arranged with a display screen of the mobile terminal in between, and touch sensors 5, 6, 7, and 8 are arranged at regular intervals on the rear surface of the mobile terminal.

Figure 8:
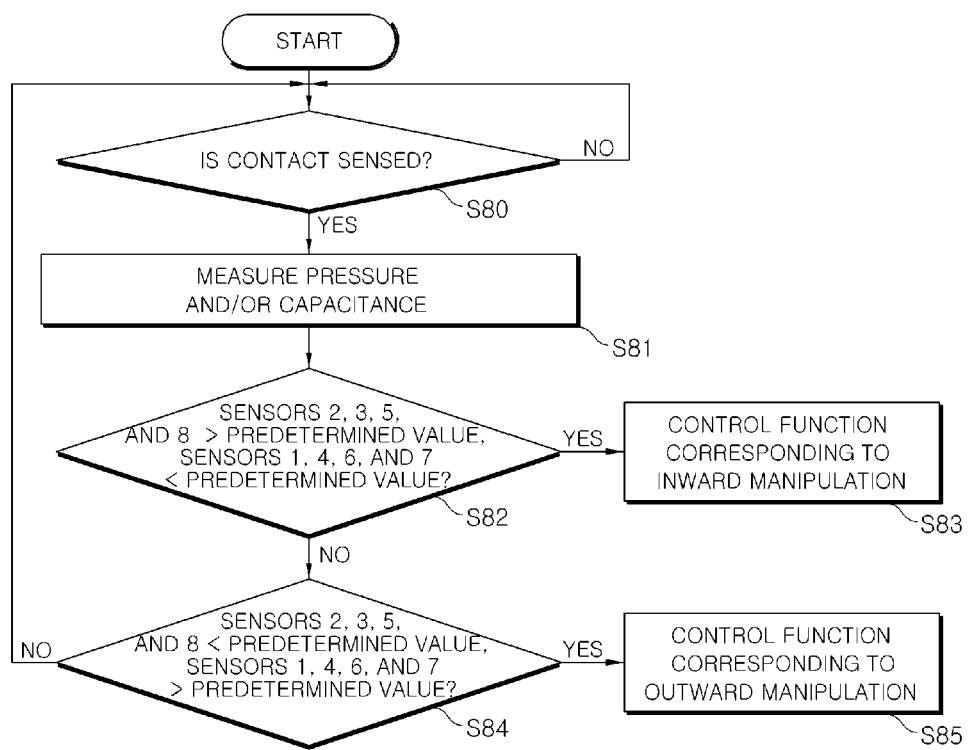
FIG. 8 is a flowchart of a method for controlling the operation of a mobile terminal, according to another embodiment of the present invention.

FIG. 8 is a flowchart of a method for controlling the operation of a mobile terminal according to another embodiment of the present invention.

In the current embodiment, it is assumed that the mobile terminal has the arrangement of 8 touch sensors as illustrated in FIG. 7.

Referring to FIGS. 7 and 8, it is determined whether the mobile terminal is contacted by a user, through 8 touch sensors 1 through 8 which are arranged on the outer surface of the mobile terminal (operation S80). That is, it is determined whether the mobile terminal is gripped by a user, through the 8 touch sensors 1 through 8.

At this point, the 8 touch sensors 1 through 8 may be pressure touch sensors which sense pressure applied to the outer surface of the mobile terminal, or capacitive touch sensors whose capacitances change according to pressure applied to the outer surface of the mobile terminal. If it is determined through the 8 touch sensors 1 through 8 that the mobile terminal is gripped by a user, pressure applied to the mobile terminal or capacitance of the touch sensors 1 through 8 is measured through the 8 touch sensors 1 through 8 (operation S81). Then, it is determined whether a change in pressure or a change in contact areas due to a change in capacitance occurs according to the measurement result of the pressure or capacitance (operation S82). For example, it is determined whether values sensed by the touch sensors 2, 3, 5, and 8 are above a predetermined value, and values sensed by the touch sensors 1, 4, 6, and 7 are below the predetermined value.

If the values sensed by the touch sensors 2, 3, 5, and 8 are above the predetermined value, and the values sensed by the touch sensors 1, 4, 6, and 7 are below the predetermined value, the mobile terminal determines that the user bends the mobile terminal inward, and controls an operation corresponding to the inward manipulation (operation S83).

Figure 9A:
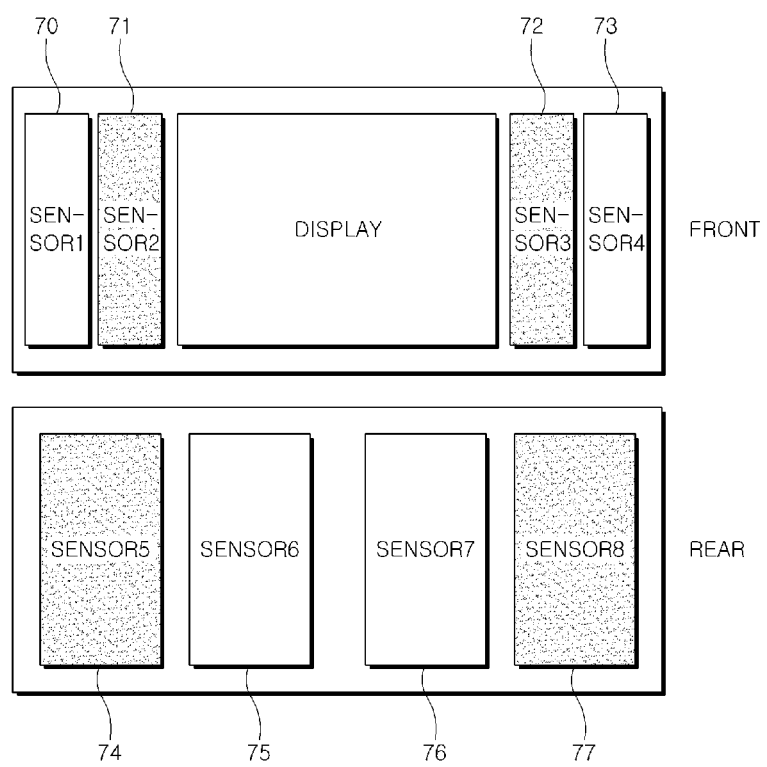
FIGS. 9A and 9B illustrate changes in contact areas of the touch sensors illustrated in FIG. 7 or in pressure applied to the contact areas, when the mobile terminal operation control method illustrated in FIG. 8 is executed.

When the user bends the mobile terminal inward, changes in the states of the touch sensors 1 through 8 of the mobile terminal are illustrated in FIG. 9A.

In FIG. 9A, the touch sensors 2 and 3, among the touch sensors 1, 2, 3, and 4 arranged on the front surface of the mobile terminal, are illustrated by a dark color in order to represent that pressure or capacitance values sensed by the touch sensors 2 and 3 are above the predetermined value. Also, the touch sensors 5 and 8, among the touch sensors 5, 6, 7, and 8 arranged on the rear surface of the mobile terminal, are illustrated by a dark color in order to represent that pressure or capacitance values sensed by the touch sensors 5 and 8 are above the predetermined value.

Meanwhile, if it is determined in operation S83 that the pressure or capacitance values sensed by the touch sensors 2, 3, 5, and 8 are not above the predetermined value, and the pressure or capacitance values sensed by the touch sensors 1, 4, 6, and 7 are not below the predetermined value, it is determined whether the pressure or capacitance values sensed by the touch sensors 2, 3, 5, and 8 are below the predetermined value, and the pressure or capacitance values sensed by the touch sensors 1, 4, 6, and 7 are above the predetermined value (operation S84).

If the pressure or capacitance values sensed by the touch sensors 2, 3, 5, and 8 are below the predetermined value, and the pressure or capacitance values sensed by the touch sensors 1, 4, 6, and 7 are above the predetermined value, the mobile terminal determines that the user bends the mobile terminal outward, and controls an operation corresponding to the outward manipulation (operation S85).

Figure 9B:
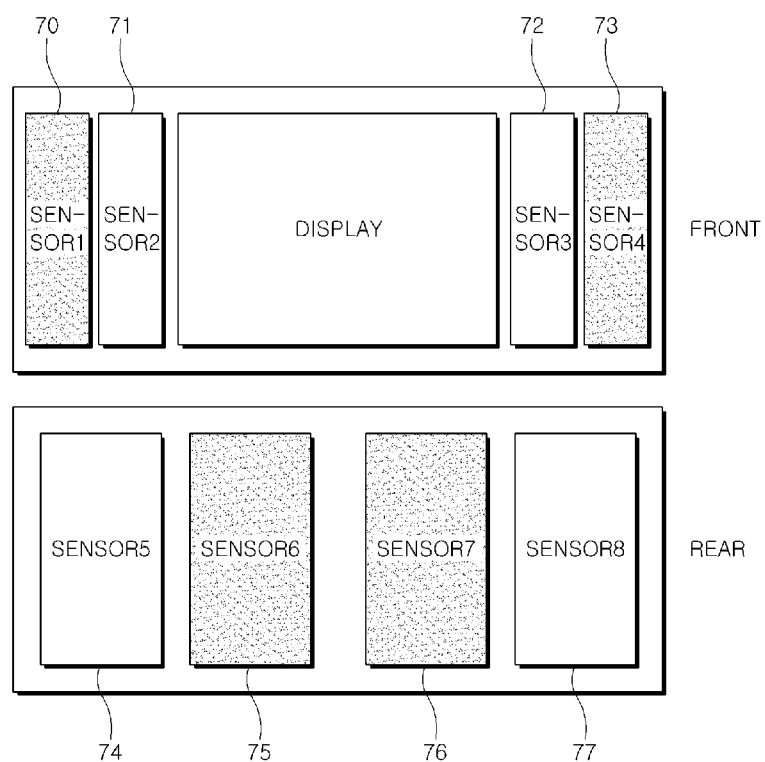

When the user bends the mobile terminal outward, changes in the states of the touch sensors 1 through 8 of the mobile terminal are illustrated in FIG. 9B.

In FIG. 9B, the touch sensors 1 and 4, among the touch sensors 1, 2, 3, and 4 arranged on the front surface of the mobile terminal, are illustrated by a dark color in order to represent that pressure or capacitance values sensed by the touch sensors 1 and 4 are above the predetermined value. Also, the touch sensors 6 and 7, among the touch sensors 5, 6, 7, and 8 arranged on the rear surface of the mobile terminal, are illustrated by a dark color in order to represent that pressure or capacitance values sensed by the touch sensors 6 and 7 are above the predetermined value.

As described above, in an apparatus and method for controlling the operation of a mobile terminal, according to the present invention, by providing a new user interface for performing a specific function according to the user's intention recognized by sensing his or her manipulation, the user can easily select or set a specific function of the mobile terminal and easily recognize information which is displayed on a screen of the mobile terminal.

That is, by dynamically selecting or setting a specific function of a mobile terminal according to a change in pressure or contact areas sensed by a plurality of touch sensors which cover the mobile terminal, a user can easily select or set a specific function of the mobile terminal according to his or her intention, and easily recognize information which is displayed on a screen of the mobile terminal.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for controlling an operation of a mobile terminal, comprising:
   a plurality of touch sensors disposed on the mobile terminal and configured to sense pressure and contact areas;
   a recognition unit configured to recognize a function, from a plurality of functions of the mobile terminal, corresponding to a pattern of respective magnitudes of applied pressure collectively applied to respective portions of the mobile terminal;
   a control unit configured to an operation corresponding to the recognition function.

2. The apparatus of claim 1, wherein the plurality of touch sensors are a plurality of pressure touch sensors which sense pressure applied to an outer surface portion of the mobile terminal, or a plurality of capacitive touch sensors whose capacitances change according to pressure applied to the outer surface portion of the mobile terminal.

3. The apparatus of claim 1, wherein the plurality of touch sensors are disposed on at least one of front and rear surface portions of the mobile terminal.

4. The apparatus of claim 1, wherein the recognition unit comprises:
   a storage unit configured to store information about different functions corresponding to respective different patterns of respective magnitudes of applied pressure to be collectively applied to the mobile terminal; and a function recognition unit configured to search for the function corresponding to the pattern of respective magnitudes of applied pressure in the information about the different functions stored in the storage unit, and provide found information about the recognized function to the control unit.

5. The apparatus of claim 4, wherein the function recognition unit is configured to recognize the function corresponding to the pattern of respective magnitudes of applied pressure through any one of a neural network, template matching, a hidden Markov model, and a support vector machine (SVM).

6. The apparatus of claim 1, wherein the recognition unit is configured to recognize the function based on a determination of whether the pattern of respective magnitudes of applied pressure indicate that the mobile terminal is being bent.

7. The apparatus of claim 6, wherein the apparatus is the mobile terminal and further comprises a user interface configured to display a page, and wherein the mobile terminal controls the displayed page to be reduced on the user interface based on a result of the determination of whether the pattern of respective magnitudes of applied pressure indicate that the mobile terminal is being bent.

8. The apparatus of claim 6, wherein the bending of the mobile terminal is determined to be inward based on an ordering of the respective magnitudes of applied pressure.

9. The apparatus of claim 8, wherein the bending of the mobile terminal is determined to be inward based on the ordering of the respective magnitudes of applied pressure from one or more touch sensors being on a rear surface portion of the mobile terminal.

10. The apparatus of claim 8, wherein the bending of the mobile terminal is determined to be inward based on the ordering of the respective magnitudes of applied pressure from one or more touch sensors being on a front surface portion and a rear surface portion of the mobile terminal.

11. The apparatus of claim 6, wherein the bending of the mobile terminal is determined to be outward based on an ordering of the respective magnitudes of applied, pressure.

12. The apparatus of claim 11, wherein the bending of the mobile terminal is determined to be outward based on the ordering of the respective magnitudes of applied pressure from one or more touch sensors being on a front surface portion of the mobile terminal.

13. The apparatus of claim 12, wherein the bending of the mobile terminal is determined to be outward based on the ordering of the respective magnitudes of applied pressure from one or more touch sensors being on a front surface portion and a rear surface portion of the mobile terminal.

14. A method for controlling an operation of a mobile terminal, comprising:

sensing respective magnitudes of applied pressure collectively applied by a user to respective portions of the mobile terminal;

recognizing a function, from a plurality of functions of the mobile terminal, corresponding to an pattern of the sensed respective magnitudes of applied pressure collectively applied to the respective portions of the mobile terminal; and controlling an operation of the mobile terminal according to the recognized function.

15. The method of claim 14, wherein the sensing of the respective magnitudes of applied pressure comprises:

receiving respective signals from respective plural touch sensors arranged on the one or more portions of an outer surface of the mobile terminal; and sensing the respective magnitudes of applied pressure using the respective signals received from the respective plural touch sensors.

16. The method of claim 15, wherein the plural touch sensors are pressure touch sensors which sense pressure applied to an outer surface portion of the mobile terminal, or capacitive touch sensors whose capacitances change according to pressure applied to the outer surface portion of the mobile terminal, and the plural touch sensors are arranged on at least one of front and rear surface portions of the mobile terminal.

17. The method of claim 14, wherein the recognizing of the function corresponding to the pattern of the sensed respective magnitudes of applied pressure comprises searching for the function corresponding to the pattern of the sensed respective magnitudes of applied pressure in information about different functions in a database, wherein the information is respective information about the different functions corresponding to respective different patterns of respective magnitudes of applied pressure collectively applied to the mobile terminal.

18. The method of claim 14, wherein the recognizing of the function corresponding to the patterns of the sensed respective magnitudes of applied pressure comprises recognizing the function corresponding to the patterns of the sensed respective pressures through any one of a neural network, template matching, a hidden Markov model, and a support vector machine (SVM).

19. The method of claim 14, wherein the recognizing of the function corresponding to the patterns of the sensed respective magnitudes of applied pressure comprises determining whether the sensed respective magnitudes of applied pressure indicate that the mobile terminal is being bent.

20. The method of claim 19, further comprising controlling a user interface of the mobile terminal to display a page on the user interface and to control the user interface to reduce the displayed page based on a result of the determining, of whether the sensed respective magnitudes of applied pressure indicate that the mobile terminal is being bent.

21. The method of claim 19, wherein the bending of the mobile terminal is determined to be inward based on an ordering of the sensed respective magnitudes of applied pressure.

22. The method of claim 21, wherein the bending of the mobile terminal is determined to be inward based on the ordering of the sensed respective magnitudes of applied pressure from one or more touch sensors being on a rear surface portion of the mobile terminal.

23. The method of claim 21, wherein the bending of the mobile terminal is determined to be inward based on the ordering of the sensed respective magnitudes of applied pressure from one or more touch sensors being on a front surface portion and rear surface portion of the mobile terminal.

24. The method of claim 19, wherein the bending of the mobile terminal is determined to be outward based on an ordering of the sensed respective magnitudes of applied pressure.

25. The method of claim 24, wherein the bending of the mobile terminal is determined to be outward based on the ordering of the sensed respective magnitudes of applied pressure from one or more touch sensors being on a front surface portion of the mobile terminal.

26. The method of claim 24, wherein the bending of the mobile terminal is determined to be outward based on the ordering of the sensed respective magnitudes of applied pressure from one or more touch sensors being on a front surface portion and a rear surface portion of the mobile terminal.

* * * * *